April 13, 1948. E. E. MOORE 2,439,524
TUBULAR HAND GARDEN WEEDER
Filed May 2, 1945 2 Sheets-Sheet 1
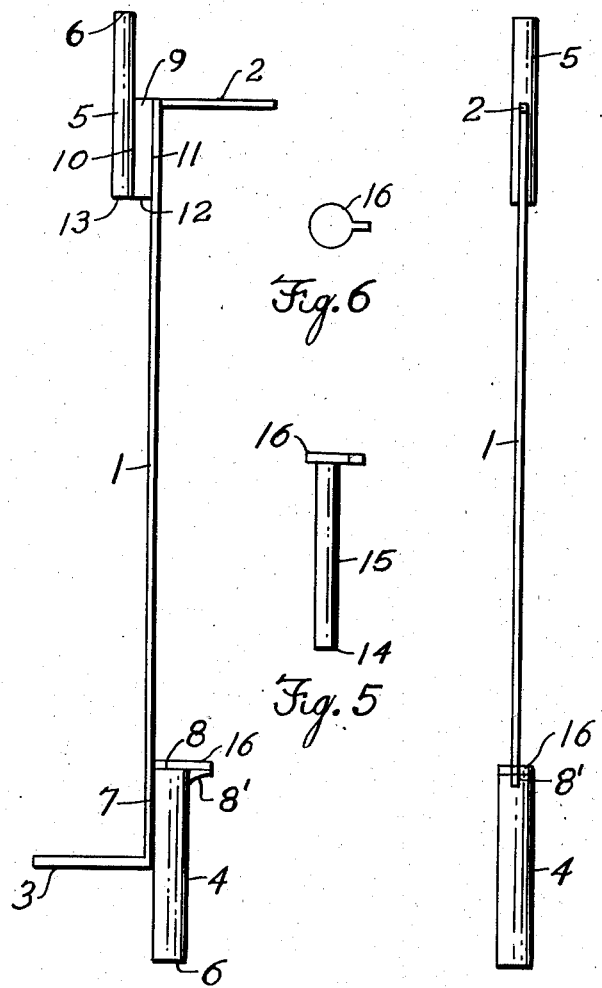
INVENTOR.
Earl E Moore

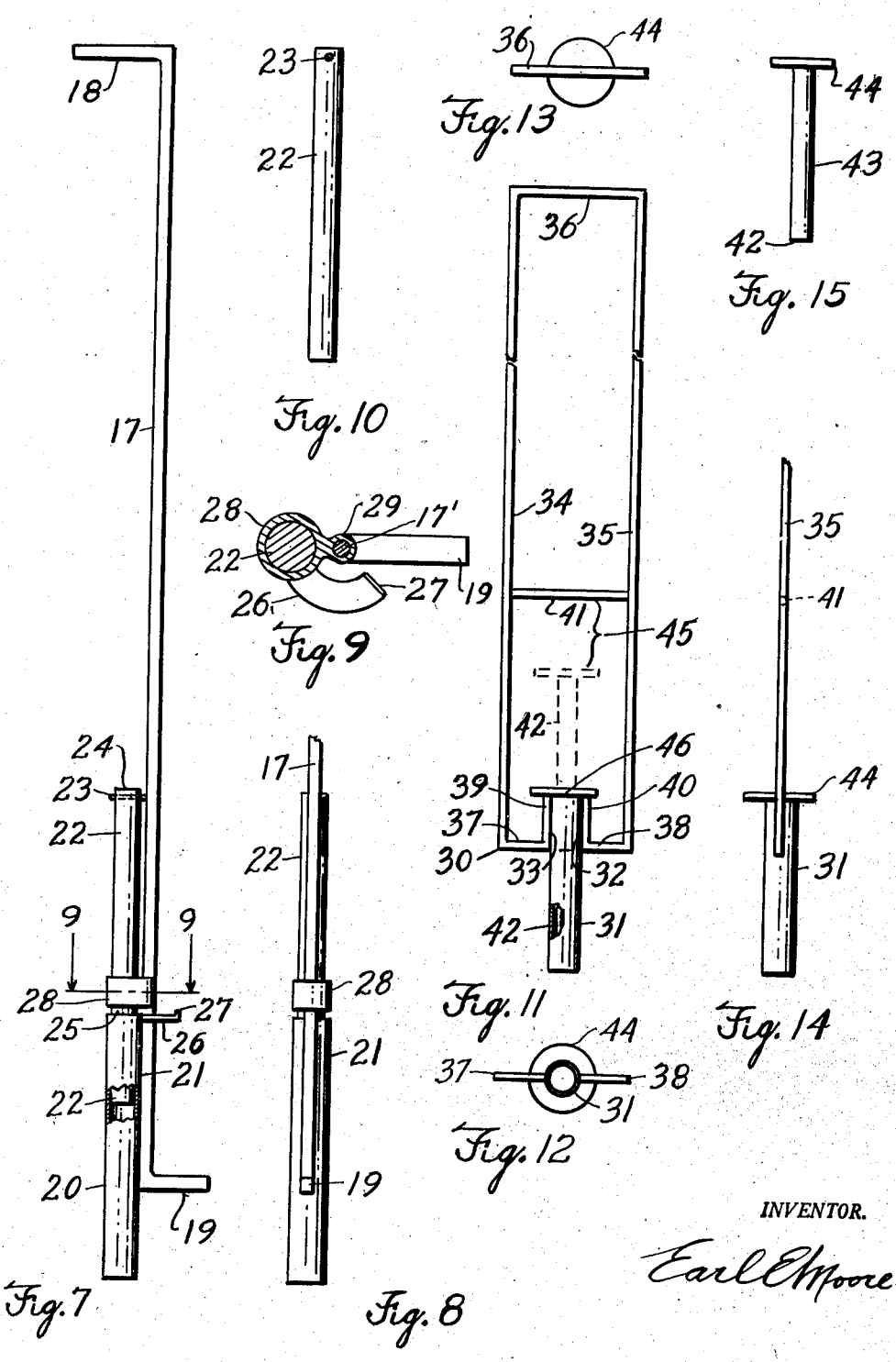

Patented Apr. 13, 1948

2,439,524

UNITED STATES PATENT OFFICE 2,439,524

TUBULAR HAND GARDEN WEEDER

Earl E. Moore, Los Angeles, Calif.

Application May 2, 1945, Serial No. 591,480

7 Claims. (Cl. 97—63)

This invention relates to tools for weeding, seeding, and planting. As a weeder, the tool removes weeds from lawns and other places and plugs the holes caused by the removal of the weeds; and as a planter, the tool makes the holes into which to place the plants and removes the plants from their beds and neatly places the plants into the holes.

When the tool is used for removing weeds and other kinds and types of unwanted growths, the tap root is neatly and easily removed with the growth without any necessity for bending the back of the operator or in getting his hands dirty, and the same is true when the tool is used as a planter. No hard work is necessary at all in weeding, or in planting with the tool; in fact, the tool can be successfully and effectively employed when the operator is dressed in his best clothes.

The tool is so designed so that it can be used with just one hand for removing the weeds and the dirt plugs, or to fill the hole made by the tool. It is so made and designed so that the weeding and/or planting job can be done by anyone in soft or hard soils. This is so because the weight of the body of the person using the tool is effective upon a relatively small area of ground with the result that no greater pressures are required than that easily available to an average size person; and furthermore, all the elements of the tool are arranged so that the greatest direct force can be applied and made effective along the vertical center of gravity of the tool.

One of the principal objects of the invention is to present a new and novel method and manner of weeding and planting with a device that is structurally simple and sturdily built, a device that is economical to make and manufacture.

Another object is to provide a weeder and/or planting device that utilizes a direct foot push for inserting the end of the device into the ground and which also utilizes a direct foot push for removing the entrapped soil plug from the device, thus avoiding and minimizing swaying and rocking of the device as well as avoiding all unnecessary unbalancing effects upon the person using the device.

Another object is to furnish a device for removing weeds from lawns without marring the lawn or leaving unsightly holes or otherwise disfiguring the lawn.

Still another object is to provide a springless weeding or planting implement that utilizes a tube-like inserting part for entering the ground, the tube-like part being positioned at an off center portion of an extended handle frame, the tube-like part having a plunger therein that is pressed directly for removing the soil plug from the inserter while holding the handle frame with but one hand, the plunger is removable, but need not be removed when it is desired to employ the feet for offset pressure or just direct hand pressure.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings:

Fig. 1 shows the first form of the invention in side elevational view, the bottom end having a plunger therein and the top end having its plunger removed, Fig. 2 is an elevational view taken in a plane at right angles to that of Fig. 1, Fig. 3 is a top plan view of Fig. 1, Fig. 4 is a bottom plan view of Fig. 2, Fig. 5 is an elevational view of one of the plungers employed in the invention illustrated of this first form.

Fig. 6 is a top plan view of Fig. 5,

Fig. 7 is a side elevational view of the second form of this invention, a portion being broken away, Fig. 8 is an elevational view of a lower portion of Fig. 7, but taken on a plane at right angles to that of Fig. 7, Fig. 9 is an enlarged view taken substantially along the line 9—9 of Fig. 7, Fig. 10 is an elevational view of a plunger employed in the second form of the invention, Fig. 11 is a side elevational view of the third form of the invention, Fig. 12 is a bottom plan view of Fig. 11, Fig. 13 is a top plan view of Fig. 11, Fig. 14 is an elevational view of the lower portion of Fig. 11, but taken on a plane at right angles thereto, and Fig. 15 is an elevational view of a plunger employed in the third form of the invention.

The first illustrated form of the invention shown in Figs. 1 to 6 inclusive, comprises a shank portion 1 having its top end bent into a hand gripping or step-on bar 2 and at its lower end also a hand gripping or step-on bar 3. Whether the bar 2 or the bar 3 will be the hand gripping bar, or either one of them the step-on bar, will depend upon the end that is held to the top when the tool is being used. The end bars 2 and 3 are preferably bent ends of a single iron bar, round or square, and the stock is of sufficient size and strength to withstand the bending forces necessary in this type of tool. The bars 2 and 3 also function as stops so that an inserter can be forced only a limited distance into the ground.

At the bottom end of the tool as shown in Fig. 1, there is bored inserter or tube 4, and at the top end a similar bored inserter or tube 5. These inserters are adapted to be inserted into the ground for encompassing the growth or thing to be removed from the ground, for instance, a weed, and the cutting ends 6 thereof may be serrated as well as sharpened in the event that the inserter tube or pipe is thick walled, but it has been found that sharpening of any kind is not necessary when the inserter is made of tubing with thin walls; in soft ground, even thick walled tubing can be used with little effort, but it has been found that the tool will be somewhat hard to push into hardened ground, like adobe, unless the tubing is thin or sharpened.

The inserter 4 is shown somewhat larger in diameter than the inserter 5 and the reason for this is that for removing very large weeds or for transplanting, etc., a larger bored inserter is preferred, for instance, an inserter wherein the bore is of a size in the neighborhood of one and a quarter inches or so, but when the tool is to be used on ordinary lawns for removing small weeds, the smaller bored inserter 5 may be used, the bore of which may be only a half to three-quarter inches in diameter.

The inserter 4 has its outer side welded or brazed at 7 to the lower end of the rod 1 and the top end 8 of the inserter is designed to be used as a treadle or foot pedal, but since this area at the top of the inserter may not be comfortable for one's foot, that is for constant long service, the area is made a little larger by use of the bracket element 8', which may be welded or brazed to the side of the inserter.

The top inserter 5 which is also adapted to be inserted into the ground, when the tool is reversed end for end, is welded or brazed to a spacer strip 9 along the line 10, and this spacer strip is brazed or welded to the rod or bar 1 along the line 11. This inserter 5 has a smaller bore than the inserter 4 and is used for seeding as well as weeding. The edge 12 of the spacer strip and the edge 13 of the inserter are used as a treadle or foot pedal by the operator for forcing the inserter into the ground.

Each inserter is provided with a plunger or soil ejector 14, obviously, the plunger for the smaller inserter 5 would be of smaller diameter than the plunger for the larger inserter 4. Fig. 5 shows the plunger best, and it is illustrated as having a stem portion 15 which should be just a little longer than the length of the inserter tube. At the top of the plunger is shown a cap or plate 16, which is designed to act as a treadle or foot pedal, and also as a stop to prevent the plunger from passing entirely through the inserter, and the diameter of the plunger is just a little less than the diameter of the bore in the inserter so that the plunger can be freely reciprocated therein.

Note, that the inserter as well as the plunger have the cross sectional center of gravity of their respective foot pedals in substantially a straight line with the cross sectional center of gravity of their respective inserters. By this arrangement, the inserter is more easily inserted into soft or hard ground, and the soil plug within the inserter is more easily ejected therefrom; this is a very important feature. Another very important feature, is that the inserter is on the same side of the shank as the cantilever handle grip. By so arranging the hand grip with its respective inserter at the opposite ends of the shank, the plunger 15 can be more effectively employed for ejecting soil plugs than if they were otherwise placed in this style of weeder. When the plunger is forced by the operator's foot into the lower portion of the inserter, the handle has just enough counter action to avoid pressure swaying of the tool, and this feature must not go unnoticed as it is an important feature when the soil plugs to be ejected within the inserter are tight therein, and this is often the case when removing weeds from adobe ground. When it is necessary to bring all the foot pressure force available to insert the inserter into hard ground, the plunger is removed and the foot pressed directly upon the inserter at 8, and then the plunger is replaced for its action of ejecting the soil plug. Either one or both of the inserters 4 and 5 may be made removable from the shank by providing threaded bores in the spacer 9 or the inserter 4 next to the shank and providing alined bores through the shank through which bolts may pass and be screwed into the threaded bores.

The second form of the invention is shown in Figs. 7 to 10 inclusive, which comprises the shank 17, an integral handle or rather a hand gripping portion 18, and the bottom foot treadle, pedal or stop bar 19, bent from the shank, as shown. At the lower portion of the shank there is an inserter tube or pipe 20 welded or brazed to the shank along the line 21. Within the shank is a plunger 22 which is a little longer than the ground inserter tube and which has through the top portion thereof a cross pin 23 which is a stop pin to prevent the plunger from passing clear through the inserter when it is forced thereinto by the operator's foot as by pressing upon the treadle or foot pedal portion 24 thereof.

The top of the inserter, at 25, is a treadle or foot pedal, and the top of this inserter has an extended portion or track 26 integral therewith or welded thereto, the distal end of which is turned to provide the stop 27. The purpose of this track is to accommodate the lower end of the plunger 22 and hold same in a convenient and ready position for shifting back into the inserter, by merely sliding it into alinement with the bore of the inserter.

The plunger is supported and guided, when out of the inserter, by the band or encircling strap 28 which has integral therewith or attached thereto a smaller band or strap 29 which has a bore that is accommodated by a reduced round portion 17' of the rod or shank 17. The parts 29 and 17' provide a socket means or journalling means for the pivoted band 28. This construction allows the operator to swing the plunger to one side when he wishes to employ his foot directly upon the top edge or pedal 25 of the inserter.

The third form of the invention, shown in Figs. 11 to 15, inclusive, comprises the frame work or shank 30 which has the inserter pipe or duct 31 fixed to the lower portion thereof as by welding or brazing along the lines 32 and 33. The framework or shank comprises the spaced apart vertical rods 34 and 35 with an integral or attached hand bar 36 at the top thereof, and the inward turned stops or lower bars 37 and 38 which function as stops to prevent the inserter from being shoved too far into the ground. Turned-up portions or bars 39 and 40 are provided to strengthen the joint between the frame or shank and the inserter pipe 31. An intermediate cross bar 41 is provided which is designed to function as a foot treadle or pedal for forcing the inserter 31 into the ground when the plunger thereof (to be presently explained) is left in the inserter.

The plunger 42 is comprised of a stem portion 43 which is a little longer than the inserter, and the cap or treadle portion 44 which is firmly attached to the top of the plunger in any suitable way, as by welding for instance when the cap is made of metal, or just screwed to the top of the plunger when the cap is made of some other kind of material, which material may be of some nonfrictional type with a tread, such as corded rubber or plastic. When the removable plunger is raised to its top position, as shown in dotted lines in Fig. 11, having been forced to this position by the entering soil as the inserter is pressed therein, the space between the top of the plunger and the under part of the cross bar 41, indicated at 45, should be great enough to accommodate the toe of a man's boot or shoe. The inserter is forced into the ground by foot pressure upon the treadle or pedal 41. In the event the ground is very hard, the plunger may be removed entirely and the foot pressure exerted directly upon the top of the inserter, as at 46.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a garden tool, a shank, an inserter at each end of the shank on opposite sides thereof, a hand grip element extending from opposite sides of the shank at the ends thereof, and foot operative means in one of the inserters for ejecting soil therefrom.

2. In a garden tool and the like, a shank portion having fixed to the ends thereof but on opposite sides thereof an inserter adapted to enter soil, means in one of the inserters for ejecting soil from within it.

3. The tool recited in claim 2 wherein the top end of the means is provided with a foot treadle, and a foot treadle also provided at the top of the inserter.

4. In a garden tool, a shank comprising an upright bar with its end portions turned in opposite directions, a bored inserter element fixed to one end of the shank opposite the side having one of the turned end portions, a plunger in the bore of the inserter, a plunger guiding bracket journalled to the shank just above the top of the inserter element and adapted to swing to one side of the inserter element, and means within the inserter element providing a guide for a lower end of the plunger for the purposes described.

5. In a garden tool, a shank consisting of a single metal bar having its ends turned in opposite directions and at right angles to the length of the shank, a soil inserter at one of the ends of the shank and protruding beyond the longitudinal limits thereof, foot treadle means at the top of the inserter, and a removable plunger means within a central bore portion of the inserter with a foot treadle portion at the top thereof.

6. The tool recited in claim 5 wherein a swivel bracket is supported by the shank and adapted to be swung to and from the top of the inserter, a plunger carried by the bracket and adapted to slide into the inserter to clear soil therefrom.

7. In a tool designed to remove weeds from soil and to transplant small plants; the tool comprising a shank having its ends provided with extensions which are directed laterally in opposite directions and which are at right angles to the length of the shank, a tubular soil inserter fixed to the shank at one end thereof and protruding beyond the longitudinal limits thereof, and a shiftable plunger means within a central bore portion of the inserter having a foot treadle portion at the top thereof.

EARL E. MOORE.

REFERENCES CITED

The following references are of record in the file of this patent:

UNITED STATES PATENTS

| Number | Name | Date |
|---|---|---|
| 235,463 | Sidewell | Dec. 14, 1880 |
| 536,895 | Richards | Apr. 2, 1895 |
| 969,701 | Jaynes | Sept. 6, 1910 |
| 1,866,073 | Aberle | July 5, 1932 |
| 2,217,109 | Gillmor | Oct. 8, 1940 |